June 12, 1962  E. S. WELCH ET AL  3,038,488
SANITARY DIAPHRAGM VALVE
Filed June 3, 1959  2 Sheets-Sheet 1
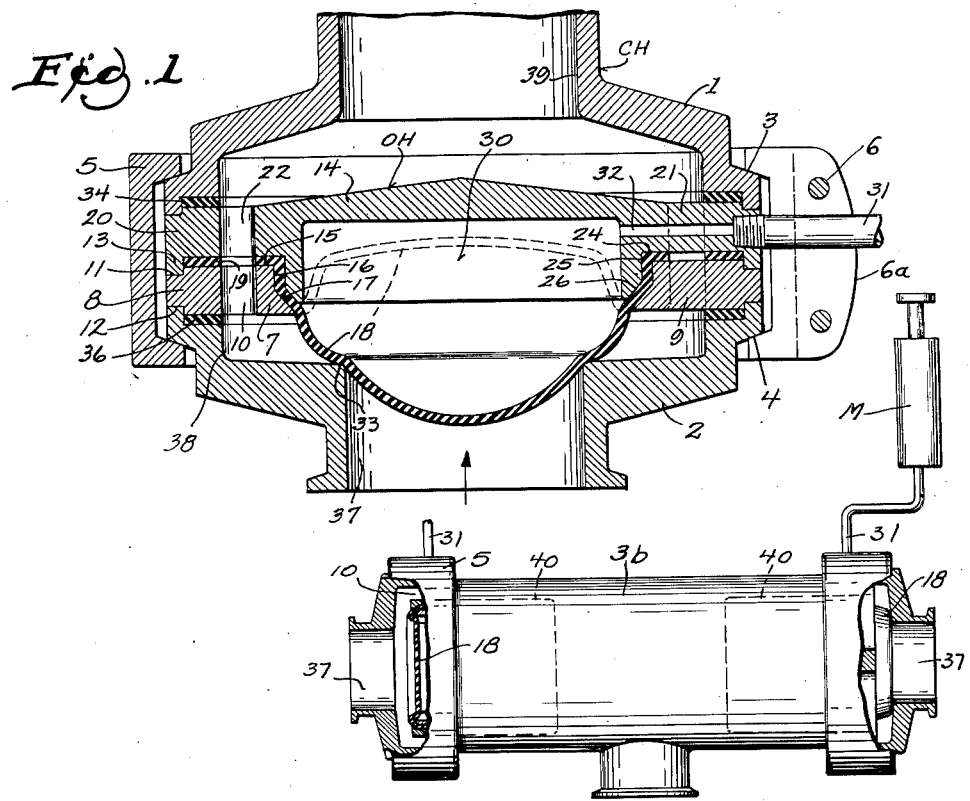
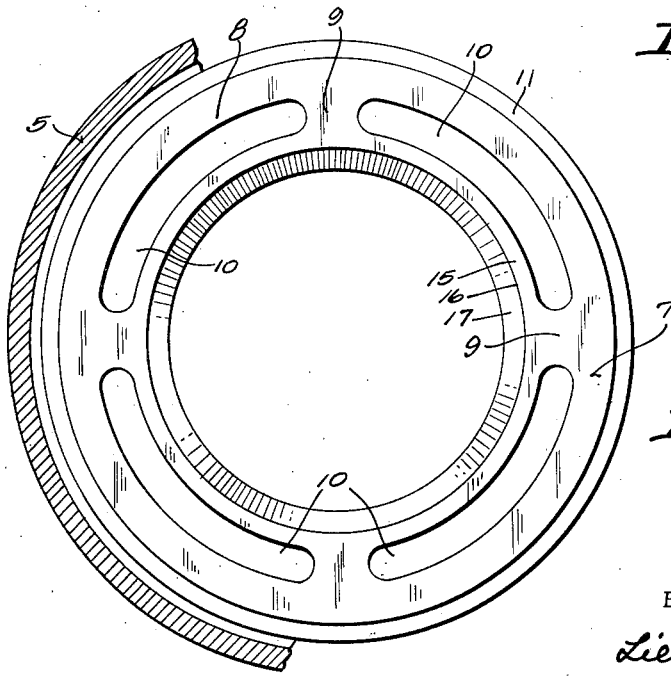
INVENTORS
ELMER S. WELCH
JAMES P. O'MEARA
BY JAMES. S. ROBERTS
Lieber, Lieber & Nilles
ATTORNEYS

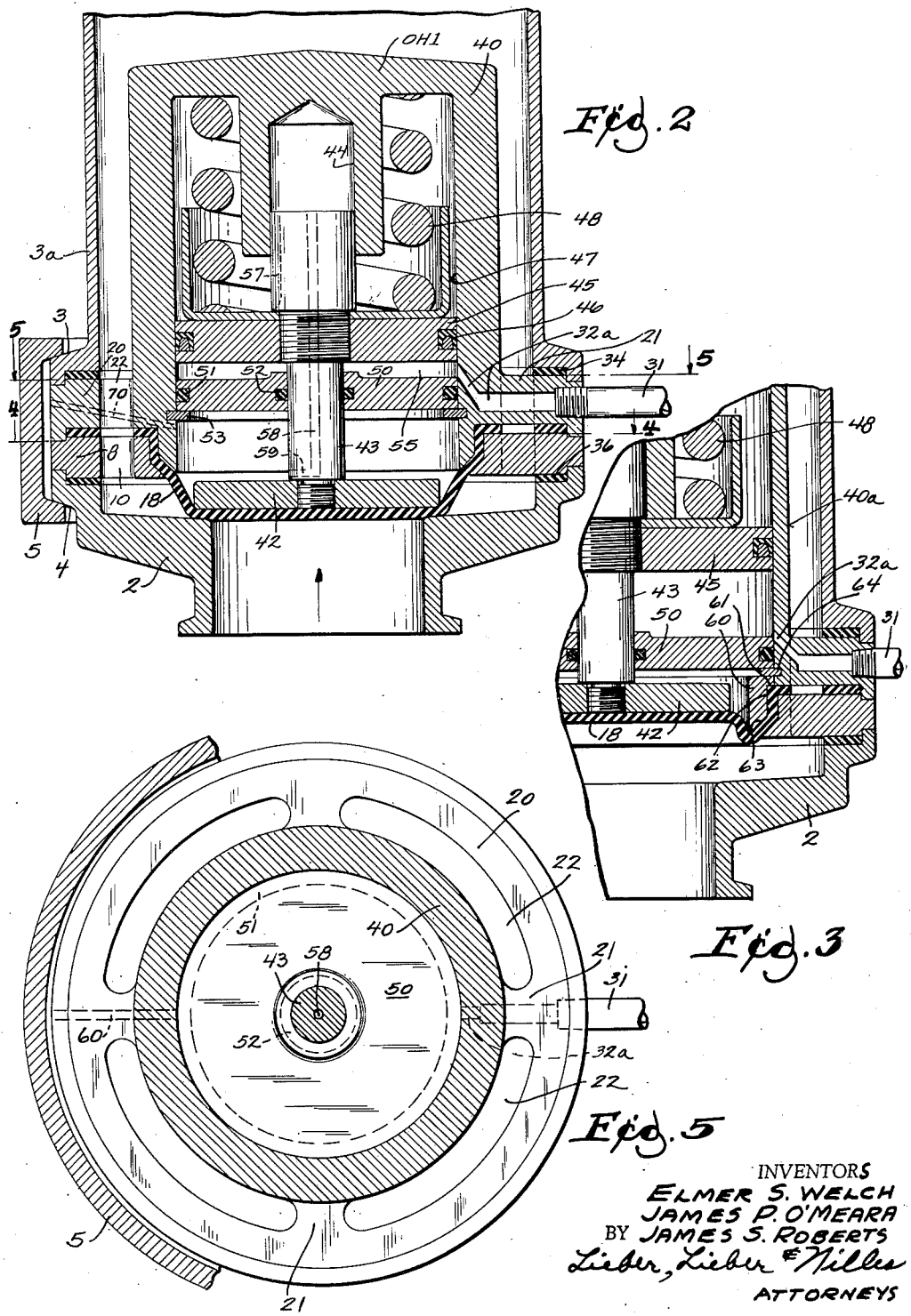

United States Patent Office 3,038,488
Patented June 12, 1962

3,038,488
SANITARY DIAPHRAGM VALVE
Elmer S. Welch, Thiensville, James P. O'Meara, Shorewood, and James S. Roberts, Milwaukee, Wis., assignors, by mesne assignments, to Milwaukee Chaplet & Mfg. Company, Inc., Milwaukee, Wis., a corporation of Wisconsin
Filed June 3, 1959, Ser. No. 817,891
4 Claims. (Cl. 137—219)

This invention relates generally to improvements in diaphragm valves of the type having a pressure actuated operator by means of which a flexible diaphragm is urged into sealing engagement with a valve seat to thereby block the flow of the product.

In some conventional diaphragm valves, the diaphragm is usually urged against a weir-like projection in the valve housing to thereby effect sealing. The diaphragm acts to separate its operator from the flow stream at all times, and the resulting valve structure is comparatively large, complex and expensive to produce.

Other types of prior art diaphragm valves are difficult to thoroughly clean, which is an important consideration, particularly when handling food products, such as, for example, milk, where rigid sanitary requirements must be adhered to in the use of such equipment. Additionally, these prior valves are difficult to assemble and disassemble in order to inspect or service the valve, and it is often necessary to shut down the entire plant for a period of time in order to inspect the valves. This is highly undesirable in modern plant practice where automatic cleaning-in-place systems are employed. In these respects the present invention is in the nature of an improvement over United States Patent Number 2,781,051, issued on February 12, 1957.

In accordance with the present invention a valve has been provided which overcomes the above mentioned difficulties.

More specifically, the present invention provides a valve having a shiftable diaphragm and operator therefor which are mounted directly in the product stream in such a manner as to be completely sanitary and provide a minimum number of crevices, projections and apertures in which the product can accumulate. The valve seat is formed as a single shoulder which is concentric in the flow path. The result is a completely draining valve of sanitary design.

Another aspect of the invention provides a valve which is an exceptionally compact, economically produced, and efficient unit, the conduit fitting which carries the fluid having, in effect, an integral, self-contained and enclosed valve.

By the use of valves made in accordance with this invention, a number of these valves can be mounted within a common and relatively small housing, to provide, for example, a threeway, normally open or normally closed valve. A greater flexibility of operation of the individual valves is possible, the valves being operated either independently of or simultaneously with one another.

An important aspect of the invention provides a valve having an improved means for securing the operator housing and its diaphragm in the conduit fitting, resulting in a completely sanitary valve.

Another object of the invention is to provide a valve of the above diaphragm type having an improved means for securing the flexible diaphragm to its associated operator housing so that a larger area is provided against which the operating pressure can be applied for any given size of operator housing and conduit. As a result a lower operating pressure can be utilized and better over-all efficiency obtained.

These and other objects and advantages of the present invention will appear hereinafter as this disclosure progresses, reference being had to the accompanying drawings in which the invention has been shown for illustrative purposes as applied to a diaphragm type of valve.

In the figures:
FIGURE 1 is a sectional view of a normally open type of valve embodying the present invention;
FIGURE 2 is a sectional view of a normally closed valve in which the invention is utilized, and in which the valve is closed;
FIGURE 3 is a fragmentary sectional view of a valve similar to the FIGURE 2 valve, but shows a modified form for securing the diaphragm to the operator housing, and the valve being in an open position;
FIGURE 4 is a sectional view taken along line 4—4 of FIGURE 2, but showing only the clamping ring portion of the operator housing as used in both the FIGURE 1 and 2 devices;
FIGURE 5 is a sectional view along line 5—5 of FIGURE 2, certain parts being broken away and removed, and showing the main portion of the operator housing; and
FIGURE 6 is a view of a three-way valve embodying the invention, parts being broken away and in section for clarity.

Referring in greater detail to FIGURE 1 of the drawings, the conduit housing CH includes the complementary housing sections 1 and 2 which have oppositely tapered surfaces 3 and 4, respectively. An operator housing OH is held captive between the housing sections by the clamping action of the split collar 5 which engages the tapered surfaces 3 and 4 and is drawn tightly therearound by bolt means 6 which extend through ear portions 6a. The sections thus form a radially enlarged portion in the conduit housing and in which the operator housing is located.

The operator housing OH is held in the conduit housing and in the product flow path in a concentric location in respect thereto. As shown for illustrative purposes, the operator housing is comprised of two parts, a main body and a clamping ring, between which is clamped a flexible diaphragm which acts as the shiftable valve element. The operator housing together with the diaphragm are located in the conduit line as follows.

The clamping ring 7 is supported concentrically in the conduit line by an outwardly extending support flange 8 having spider arms 9 which define elongated and circumferentially spaced slots 10 located in the product flow path. An annular ridge 11 around the periphery of support ring 7 acts as a complementary engaging portion for accurate location with the complementary axial flange 12 of the conduit section 2 and a flange 13 of the main body 14. The clamping ring 7 has surfaces 15, 16 and 17, all of which act as clamping surfaces for engaging a flexible diaphragm 18.

The main body 14 of the operator housing is supported concentrically within the conduit line and product stream by means of a radially extending flange 20 formed integrally therewith and which has spaced spokes 21 which define slots 22, which slots are similar in shape to and register with slots 10. Body 14 has clamping surfaces 24, 25 and 26 which complement surfaces 15, 16, and 17, respectively, and between which the diaphragm 18 is tightly clamped around its outer edge which edge has slots 19 which are aligned with slots 10 and 22. The main body is generally cup-shaped and with the diaphragm forms a pressurizable chamber 30 to which fluid pressure may be introduced through the conduit 31 which conduit extends outwardly to a conventional source of pressure, such as for example, an air motor M, although any suitable form of pressure producing medium may be used as necessary or desirable. More specifically, the conduit 31 is threadably engaged in the flange 20, or otherwise suitably secured therein so as to be in communication with chamber 30 via the connecting port 32 which extends through one of the spiders 21 and into the chamber 30.

The diaphragm as shown by the full lines in FIGURE 1 is in the closed position where it seals against the smooth shoulder 33 which forms the valve seat. The diaphragm is held tightly in this sealing position by pressure introduced into chamber 30 via conduit 31. The distance which the diaphragm travels to the closed position is small and it seats only against the smooth shoulder 33 when closed. There are no other apertures or projections to cause wear of the diaphragm. The shoulder 33 is easily machined and there is practically no frictional contact of the diaphragm with this shoulder.

Assume the product flow through the conduit CH is in the direction indicated by the arrow. When the pressure is released from chamber 30, the diaphragm collapses to the dotted line position and permits the fluid to flow readily through the aligned and large ports 10 and 22 and completely around the diaphragm and operator housing. Sealing gaskets 34 and 36 are provided between the conduit sections and the support means for the operator housing, as indicated. The gaskets act to provide a tight seal with no minute cracks which tend to collect the product, and this is important in a sanitary valve.

The embodiment shown in FIGURE 1 is a normally open valve, that is, chamber 30 is normally unpressurized and the product flows as indicated by the arrow from the conduit line portion 37 and counterbore 38 of section 2, through aligned ports 10 and 22, and into conduit line portion 39 of section 1. It will be noted that the flow path is free of any fluid traps or obstructions, and good drainage and thorough cleaning of the valve is assured.

The device of FIGURE 2 is a normally closed valve in which a spring biases the shiftable valve element to the closed position. Parts similar to those in the FIGURE 1 device have been correspondingly numbered.

The conduit housing section 3a of FIGURE 2 is enlarged and contains the operator housing OH1. The operator body 40 may be mounted concentrically in housing 3a in the same manner as shown in FIGURE 1, and it likewise clamps against its diaphragm.

A diaphragm contacting member in the form of plate 42 is threaded on one end of shaft or rod 43, the other of which is slidable in the bore 44 of the housing. A piston 45 is threaded to an intermediate part of rod 43 and has a sliding seal 46 around its periphery for sealing engagement with bore 47 of the housing. A spring 48 acts between the housing and piston 45 to yieldingly hold the plate 42 and its associated diaphragm in the sealing position on the valve seat. This is the normally closed position of the valve.

The diaphragm is made of relatively stiff but sufficiently elastic material to permit it to stretch, within its elastic limit, between its area where it is contacted by the plate 42 and where it is clamped around its outer portion. This material may be of rubber, neoprene or the like.

A sealing disc 50 is mounted in the bore 47 and around the shaft 43. O-ring seals 51 and 52 on the disc seal against bore 47 and shaft 43, respectively. A snap ring 53 fixes the disc against movement in the downward direction. The disc does not move in bore 47 relative to the housing and the shaft 43 slides through the disc.

The disc 50 together with the piston 45 defines a pressurizable chamber 55 with which the fluid pressure conduit 31 is in communication via bore 32a.

When the valve is to be opened, pressure fluid is introduced via conduit 31 and passage 32a into chamber 55, forcing the piston and its rod 43 in an upward direction and permitting the product in the line to flow past the diaphragm.

In order to exhaust any captive air in the upper end of bore 47 when the piston 45 moves in a valve opening direction, an exhaust passage is provided so the inner end of bore 47 can breathe. This passage is comprised of a slot 57 milled axially in a peripheral portion at the end of rod 43, bores 58 and 59 extending axially and radially, respectively, in the rod, and a bore 70 through the housing OH1 and its spider 21 and support ring 20.

FIGURE 3 illustrates a modified form for securing the diaphragm in place. In this embodiment the main body 40a of the operator housing is of a larger internal diameter than the housing 40 of the FIGURE 2 device. This provides a pressure chamber of greater cross sectional area which in turn permits the use of lower pressure for operating the valve. The use of a thinner wall construction for the housing is permitted by providing a separate holding ring 60 having surfaces 61, 62 and 63 which complement surfaces 15, 16 and 17, respectively, of the clamping ring 7. The snap ring 64 securely holds the ring 60 in proper assembled position.

FIGURE 6 illustrates a three-way T-valve employing multiple valves of the type provided by this invention. One of the valves has been shown in the open position and the other one closed. The valves are inserted in a common body 3b which results in a relatively small and compact unit in which the valves are self-contained within the body. The over-all length of this unit may be as much as one-third shorter than a unit using conventional valves.

Recapitulation

In any of the embodiments shown, the shiftable valve element and its operator are mounted completely and concentrically within the product line and when the valve is open the product flows completely therearound. The particular radial flange means with large slots for the passage of the product gives a relatively turbulent free flow path through the assembly. The product stream does not change directions when passing through this mounting means for the operator.

These valves find particular utility when used as remotely-controlled air-operated sanitary valves for "clean-in-place" equipment. They are completely sanitary and easily purged when being cleaned, and as a result, hand cleaning of these valves is unnecessary and damage which usually attends such cleaning is eliminated. They are also easily and quickly assembled and disassembled.

Various modes of carrying out the invention are contemplated as being within the scope of the following claims particularly pointing out and distinctly claiming the subject matter which is regarded as the invention.

What is claimed and desired to be secured by Letters Patent is:

1. A valve assembly comprising, a conduit housing having a pair of complementary sections secured together to form a flow path therethrough for a product, a valve seat on one of said sections and located in said flow path, an operator housing located within said path, a flexible diaphragm connected with said operator housing and engageable when closed with said valve seat, a flange secured to said operator housing and extending in a generally outward direction therefrom, a clamping ring clampingly holding said diaphragm on said operator housing to form a pressurizable chamber therein, said ring also having an outwardly extending flange, said flanges sealingly engaged between said sections to securely hold said operator housing and diaphragm concentrically and directly in said flow path, said flanges having aligned openings therethrough and spaced circumferentially around said operator housing to permit product flow through said flanges and around said operator housing and diaphragm when the latter is in an open position.

2. A valve assembly comprising, a conduit housing having a pair of complementary sections secured together to form a flow path therethrough for a product, a valve seat on one of said sections and located in said flow path, a generally hollow operator housing having an open end and located within said path, a flexible diaphragm connected across the open end of said operator housing and forming a chamber therein, a diaphragm contacting member shiftably mounted within said chamber for urging said diaphragm to a closed position against said valve seat, resilient means urging said member to a diaphragm closed position, means in said chamber defining an expansible and pressurizable portion therein, passageway means adapted to place said chamber portion in communication with a source of fluid pressure whereby when said portion is pressurized sufficiently said member will be urged against said resilient means to a diaphragm open position, a flange secured to said operator housing and extending in a generally outward direction therefrom, a clamping ring clampingly holding said diaphragm across said operator housing end, said ring also having an outwardly extending flange, said flanges sealingly engaged between said sections to securely hold said operator housing and diaphragm concentrically and directly in said flow path, said flanges having aligned openings therethrough and spaced circumferentially around said operator housing to permit product flow through said flanges and around said operator housing and diaphragm when the latter is in said open position.

3. A valve assembly comprising, a conduit casing having a flow path therethrough for a product, a valve seat located in said flow path, a generally hollow operator housing having an open end and located within said path, a flexible diaphragm connected across the open end of said operator housing and forming a chamber therein, a diaphragm contacting member shiftably mounted within said chamber for urging said diaphragm to a closed position against said valve seat, resilient means urging said member to a diaphragm closed position, means in said chamber defining an expansible and pressurizable portion therein, passageway means adapted to place said chamber portion in communication with a source of fluid pressure whereby when said portion is pressurized sufficiently said member will be urged against said resilient means to a diaphragm open position, a holding ring fixed in said housing, a clamping ring clampingly holding said diaphragm across said operator housing end and against said holding ring, means securely holding said operator housing and diaphragm in said casing and concentrically and directly in said flow path.

4. A valve assembly comprising, a conduit housing having a pair of complementary sections secured together to form a flow path therethrough for a product, a valve seat on one of said sections and located in said flow path, a generally hollow operator housing having an open end and located within said path, a flexible diaphragm connected across the open end of said operator housing and forming a chamber therein, a diaphragm contacting member shiftably mounted within said chamber for urging said diaphragm to a closed position against said valve seat, resilient means urging said member to a diaphragm closed position, means in said chamber defining an expansible and pressurizable portion therein, passageway means adapted to place said chamber portion in communication with a source of fluid pressure whereby when said portion is pressurized sufficiently said member will be urged against said resilient means to a diaphragm open position, a flange secured to said operator housing and extending in a generally outward direction therefrom, a holding ring fixed in said housing, a clamping ring clampingly holding said diaphragm across said operator housing end and against said holding ring, said clamping ring also having an outwardly extending flange, said flanges sealingly engaged between said sections to securely hold said operator housing and diaphragm concentrically and directly in said flow path, said flanges having aligned openings therethrough and spaced circumferentially around said operator housing to permit product flow through said flanges and around said operator housing and diaphragm when the latter is in said open position.

References Cited in the file of this patent

UNITED STATES PATENTS

| 1,441,784 | Clayton | Jan. 9, 1923 |
| 2,085,893 | Boland | July 6, 1937 |

FOREIGN PATENTS

| 26,434 | Great Britain | Feb. 24, 1913 |
| 1,131,871 | France | Oct. 29, 1956 |
| 566,440 | Canada | Nov. 25, 1958 |